J. McADAMS.
COMBINATION HOLDER AND GRIP.
APPLICATION FILED AUG. 11, 1915.
1,213,517.
Patented Jan. 23, 1917.
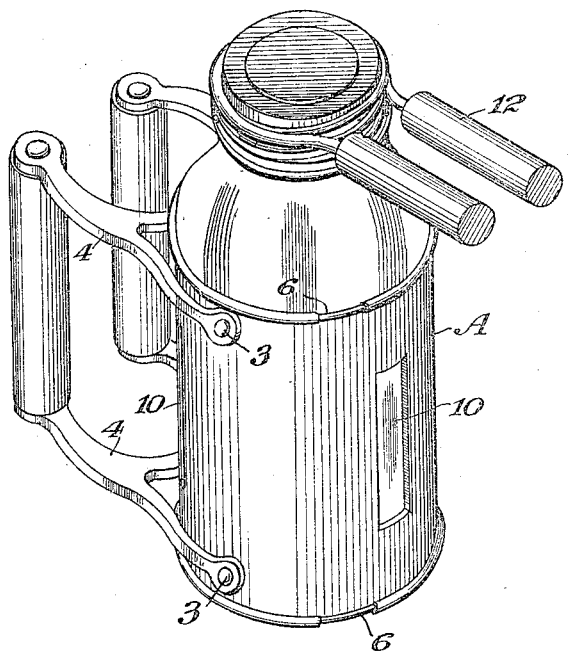
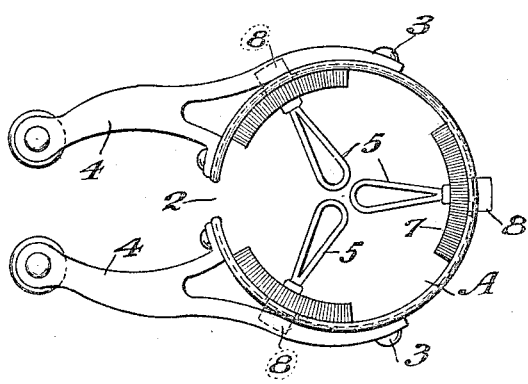
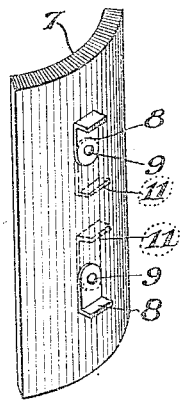
WITNESSES:
L. J. Forde.
B. M. Doolin.
INVENTOR
James McAdams.
BY Strong & Townsend
ATTORNEYS.

UNITED STATES PATENT OFFICE.

JAMES McADAMS, OF SAUSALITO, CALIFORNIA.

COMBINATION HOLDER AND GRIP.

1,213,517. Specification of Letters Patent. Patented Jan. 23, 1917.

Application filed August 11, 1915. Serial No. 44,912.

*To all whom it may concern:*

Be it known that I, JAMES McADAMS, a citizen of the United States, residing at Sausalito, in the county of Marin and State of California, have invented new and useful Improvements in Combination Holders and Grips, of which the following is a specification.

This invention relates to a combination holder and grip.

One of the objects of the present invention is to provide a simple, substantial, cheaply manufactured household utensil, particularly adapted for use during the fruit-canning season.

The device comprises a receptacle or holder adapted to temporarily receive a fruit jar or like device while it is being filled; it is also provided with projecting handles permitting the receptacle containing the fruit jar to be held while being filled and also clamped against turning movement when the cover is applied.

A further object is to provide means for increasing or decreasing the interior diameter of the holder to suit various sizes of jars or bottles.

The invention consists of the parts and the combination and construction of parts as hereinafter more fully described and claimed having reference to the accompanying drawings, in which—

Figure 1 is a perspective view of the holder showing a fruit jar mounted therein while the cover is being applied. Fig. 2 is a plan view of the holder showing the spacing blocks inserted. Fig. 3 is a perspective view of one of the spacing blocks.

Referring to the drawings in detail, A indicates a cylindrical-shaped receptacle or holder which is split on one side, as indicated at 2 to permit it to be slightly contracted to grip or clamp the fruit jar, or like receptacle placed therein.

Suitably secured on the exterior of the cylindrical shaped container A as at 3, is a pair of rearwardly projecting handles 4 by which the device may be held while the fruit jar is being filled, and also clamped when the cover is to be applied. For the purpose of otherwise supporting the fruit jar within the cylindrical-shaped container A, or in other words, to prevent it from dropping through, a plurality of inwardly projecting foot members 5 have been provided. These may be formed of wire, or by bending sections of metal formed integral with the main cylinder A, inwardly. In the present instance the cylinder A is constructed of thin sheet metal, the edges of which have been reinforced by wire, as indicated at 6; the inwardly projecting feet 5 being formed integral with the reinforcing wire 6.

For the purpose of increasing or decreasing the interior diameter of the cylinder or holder A, a plurality of segmental spacing blocks 7 have been provided. These blocks are provided with projecting lugs 8 which are pivotally mounted as at 9, on the exterior side of each spacing block, and when inserted in the container are so positioned as to project through registering slots 10, formed in the side of the cylinder. When the blocks are first inserted the lugs are turned into the dotted line position indicated at 11, Fig. 3. They are then turned about their pivots 9 into full line position indicated at 8, Fig. 3, where they will assume a position exterior of the cylinder, and hold the blocks in position.

In operation, the fruit jar to be filled is placed within the holder or cylinder A, as shown in Fig. 1, the holder containing the jar is then held by means of the handles 4 while the jar is being filled. The ordinary rubber gasket is then applied around the neck of the jar, and the cover applied, either by hand or by means of a cover clamping grip, such as indicated at 12. The split tool in the cylinder, together with the separated handles 4 permit the jar as a whole to be securely clamped within the cylinder while the cover is being tightened by means of the cover clamp 12. The provision of the holder A not only permits the cover to be more securely applied, but it also prevents the operator from getting burned by over-flowing fruit, or the head of the jar proper.

While the device as a whole has been described as a means for supporting jars while being filled, it is also equally useful in opening already filled jars, for use. The jar is in that instance also inserted in the container being clamped and held therein by means of handles 4, the cover clamp 12 is then applied to the cover to remove same. The great leverage produced by handles 4 and the cover clamp 12 permits the cover to be easily removed, thus eliminating the destruction of the gasket and cover, which is the usual practice when removing covers by the old method. For instance, it is common practice to run a knife between the gasket and cover to loosen one from the other. In this manner the lower edge of the cover is indented, or otherwise mutilated while the gasket proper is generally cut and destroyed.

From the foregoing description it will be seen that the destruction of the cover and gasket by the use of my device is entirely eliminated, and the cover is furthermore removed with greater ease and in less time.

The materials and finish of the several parts of the device may be such as the judgment and experience of the manufacturer may dictate.

I wish it understood that various changes in form, proportion and minute details of construction may be resorted to within the scope of the appended claims, and that I do not wish to limit myself to the specific design and construction here shown.

Having thus described my invention what I claim and desire to secure by Letters Patent is—

1. In a jar holder, a split gripping member formed with slots, handles connected to the member to draw same about the jar, removable blocks for decreasing the interior diameter of the member disposed interiorly of the member, and a pair of locking elements movably connected to each block of a size to project through the slots, said elements being movable to engage the exterior face of the gripping member so as to lock the blocks thereto.

2. In a jar holder, a split gripping member formed with slots, handles connected to the member to draw same about the jar, removable blocks for decreasing the interior diameter of the member disposed interiorly of the member, and a pair of L-shaped locking lugs pivotally connected at one end to each block, said lugs when moved to have their free ends lie adjacent and in confronting relation being insertible in the slots and when moved to have their free ends point in the opposite directions being engaged with the exterior face of the member at points beyond the ends of the slot.

In testimony whereof I have hereunto set my hand in the presence of two subscribing witnesses.

JAMES McADAMS.

Witnesses:
 JOHN H. HERRING,
 W. W. HEALEY.

Copies of this patent may be obtained for five cents each, by addressing the "Commissioner of Patents, Washington, D. C."